United States Patent
Prather et al.

(10) Patent No.: US 9,379,750 B2
(45) Date of Patent: *Jun. 28, 2016

(54) SYSTEMS AND METHODS FOR DAMPENING TDMA INTERFERENCE

(71) Applicant: AT&T Mobility II LLC, Atlanta, GA (US)

(72) Inventors: Scott Dale Prather, Seattle, WA (US); Cameron Kelly Coursey, Peachtree Corners, GA (US); Ginger Li Chien, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/557,615

(22) Filed: Dec. 2, 2014

(65) Prior Publication Data

US 2015/0171904 A1 Jun. 18, 2015

Related U.S. Application Data

(63) Continuation of application No. 12/270,729, filed on Nov. 13, 2008, now Pat. No. 8,913,961.

(51) Int. Cl.
*H04W 4/00* (2009.01)
*H04B 1/10* (2006.01)
*H04W 88/06* (2009.01)

(52) U.S. Cl.
CPC .............. *H04B 1/109* (2013.01); *H04W 4/008* (2013.01); *H04W 88/06* (2013.01)

(58) Field of Classification Search
USPC ........... 455/567, 437, 557, 194.1, 297, 550.1, 455/522, 12.1, 13.4, 114.2
See application file for complete search history.

(56) References Cited

U.S. PATENT DOCUMENTS

| | | | | |
|---|---|---|---|---|
| 3,990,075 A | * | 11/1976 | Schmitz | G08B 29/04 340/384.7 |
| 4,081,747 A | * | 3/1978 | Meyerle | G08C 19/22 455/68 |
| 4,173,016 A | * | 10/1979 | Dickson | G01S 13/74 340/10.1 |
| 4,241,236 A | * | 12/1980 | Nash | H04M 1/737 379/392.01 |
| 5,734,969 A | * | 3/1998 | Shiraishi | H04J 3/0602 370/294 |
| 6,697,647 B2 | | 2/2004 | Higuchi et al. | |
| 7,292,564 B2 | * | 11/2007 | Ekstrom | H04L 65/4061 370/285 |
| 7,477,922 B2 | | 1/2009 | Lewis | |
| 8,583,130 B2 | | 11/2013 | Rousselin et al. | |

(Continued)

OTHER PUBLICATIONS

U.S. Office Action dated Oct. 28, 2011 in U.S. Appl. No. 12/270,729.

(Continued)

*Primary Examiner* — Ganiyu A Hanidu
(74) *Attorney, Agent, or Firm* — Hartmann & Citrin LLC

(57) ABSTRACT

Systems and methods are disclosed which relate to mitigating the detrimental effects of interference to electronic devices from mobile telephones utilizing any form of time-domain multiplexing technology. A wireless transmitter inside the mobile telephone broadcasts a warning transmission which can be received by affected devices. Once the warning transmission is received by an affected device, the device activates a blanking circuit comprising an actuator and a switch or switches. The switches open for the duration of the interference so that the user does not receive undesired output such as: noise through a speaker, noise through a microphone, or other interference with electrical signals.

20 Claims, 10 Drawing Sheets

(56) References Cited

U.S. PATENT DOCUMENTS

| | | |
|---|---|---|
| 2005/0209858 A1 | 9/2005 | Zak |
| 2008/0201138 A1 | 8/2008 | Visser et al. |
| 2009/0028115 A1 | 1/2009 | Hirsch |
| 2010/0280824 A1* | 11/2010 | Petit .................... G10L 21/0208 704/214 |

OTHER PUBLICATIONS

U.S. Office Action dated Apr. 11, 2012 in U.S. Appl. No. 12/270,729.
U.S. Office Action dated Jan. 15, 2014 in U.S. Appl. No. 12/270,729.
U.S. Notice of Allowance dated Jun. 19, 2014 in U.S. Appl. No. 12/270,729.

* cited by examiner

SYSTEMS AND METHODS FOR DAMPENING TDMA INTERFERENCE

CROSS-REFERENCE TO RELATED APPLICATIONS

This application is a continuation of and claims priority to U.S. patent application Ser. No. 12/270,729, now U.S. Pat. No. 8,913,961, filed on Nov. 13, 2008, entitled "Systems and Methods for Dampening TDMA Interference," which is expressly incorporated herein by reference in its entirety.

BACKGROUND OF THE INVENTION

1. Field of the Invention

The present invention relates to mitigating cellular telephone interference. More specifically, the present invention relates to utilizing blanking to mitigate interference in electrical devices due to RF pulse transmissions from TOMA-based telephones.

2. Background of the Invention

In 2006, there were an estimated two-billion cellular telephones worldwide. Today there are countless cellular telephones in use. Cellular telephones communicate with a network of cellular towers to transmit calls between users. This network of cellular towers includes many towers in many places, but the number of cellular telephones grossly outweighs them. In order for these cellular towers to communicate with each cellular telephone individually, some form of multiplexing needs to be employed.

Multiplexing is a process where multiple analog message signals or digital data streams are combined into one signal over a shared medium. This process combines multiple signals and sends them as a single, complex signal. For analog transmission, signals are commonly multiplexed using frequency-division multiplexing (FDM), in which the carrier bandwidth is divided into sub-channels of different frequency widths, each carrying a signal at the same time in parallel. For digital transmission, signals are commonly multiplexed using time-division multiplexing (TOM), in which the multiple signals are carried over the same channel in individual time slots. Once the complex time-division signal reaches its destination, a de-multiplexer is used to separate the combined signals.

Time-division multiplexing is the basis for the standard in cellular communications known as Time Division Multiple Access (TOMA), which is used by Digital-American Mobile Phone Service (D-AMPS), Global System for Mobile communications (GSM), and Personal Digital Cellular (PDC). Of these, the GSM standard is the most commonly used having over 120 million users, offered in over 120 countries, and is the standard in Europe.

A cellular telephone using the GSM standard employs a radio frequency (RF) transmitter to communicate with the nearest cellular tower. During this communication the RF transmitter turns on and off at a fast rate of about 217 Hz. This high frequency switching on and off is known as the RF transmitter's pulse repetition rate, which has a pulse width, or burst, of about 577 microseconds (µs). This RF transmission burst can be unintentionally received by nearby electronic devices that do not have proper RF shielding, or are connected to other devices that do not have proper RF shielding. When this nearby electronic device is an audible device, such as a television, hearing aid, or anything with a speaker or headphone, the burst can be heard by a human. Typically, the human ear can pick up frequencies that range from roughly 20 to 20,000 Hz. Not everyone has exactly the same range, but a frequency of 217 Hz can be easily heard by most people.

Many have had the experience of hearing a buzzing sound emitting from a nearby speaker seconds before they receive a phone call. There are a number of factors involved that dictate this occurrence. The farther a cellular telephone is from the nearest tower, the more powerful signal it must produce to communicate with it. A more powerful signal has a greater likelihood of interfering with nearby electronic devices. Also, the closer the electronic device is to the cellular telephone the more likely the electronic device will be unintentionally affected by the phone's burst transmissions. If the electronic device is hard-wired to the cellular telephone, such as a hands-free ear piece, it can pick up the burst transmission even more easily. The power from the RF transmitter's direct current (DC) supply circuitry will fluctuate due to the relatively large power consumption from the RF transmitter turning on and off. The power to the transmitter also fluctuates at 217 Hz, and this can be picked up by the ear piece, making it difficult to hear. In some cases the microphone of the cellular telephone may also be affected, making it difficult for the other person to hear as well.

Medical equipment, while not necessarily having speakers attached, can be sensitive to the frequencies it detects, and is dependent upon them for results. Interference with these sensitive frequencies can skew results, which can lead to misdiagnoses and resultant harm or death of the patient. As a result, many hospitals do not allow, or discourage, the use of cellular telephones except in designated areas.

Presently, there exist a few ways to avoid this interference. One method is to simply move the cellular telephone away from the affected electronic device. The distance between the cellular phone and the electronic device determines the amount of interference, which translates into the audible volume of the interference through an affected speaker. The cellular telephone may be moved to a distance where the interference is no longer present, or at least to where the interference can no longer be heard. This method may work if the interfering device is known, and can be avoided, but this is not always the case. Many times the user may be standing in a position where the signal is the greatest between the cellular telephone and the tower and any change in location may be suboptimal or even nonfunctional. Also, this method will not work when the affected device is attached to the user, such as with a hearing aid, or any device hard-wired into the cellular telephone. In the case of medical devices, the problem is not merely annoyance, but a change in the results. Since this cannot be detected by the user, a change in location does not appear to be necessary and the user has no way of knowing how far away to move. Furthermore, medical devices can be affected by less interference than what would be audible. Certain medical devices must have no interference at all in order to operate properly. This requires the user to move a greater distance from a medical device than a speaker.

Another method of avoiding RF burst transmission interference is to employ the proper amount of shielding in electronic devices that can be affected by this interference. Shielding of electronic devices and cables includes creating a mesh of interwoven conductive fiber such as copper, iron, or even gold. The fiber mesh acts as a series of loops which dissipates the signal before it reaches the underlying electronic device or cable. Though simple in architecture, this type of shielding is expensive. Even if an electronic device is properly shielded, it may receive interference anyway through any hard-wired device or cable that is not properly shielded. Just one unshielded cable can cause every electronic device to which it's connected, and every device to which those devices are connected, to receive the interference that the unshielded cable receives. This solution will not cure interference with a device that is hard-wired to the telephone either.

The RF transmitter in a cellular telephone is only turned on when making or receiving calls. Either the tower sends a signal to cellular telephone telling it to activate its RF transmitter, or the user elects to place a call. In both cases, the cellular telephone must follow a specific protocol when setting up the call, and this results in a situation where the phone is aware of precisely when its RF transmitter will be activated. What is needed in the art is a system and method of alerting nearby electronic devices of impending interference based on the phone's knowledge of when it will transmit. This alert should be received by nearby electronic devices in time to compensate for the interference.

SUMMARY OF THE INVENTION

The present invention includes systems and methods to mitigate the detrimental effects of interference to electronic devices from mobile/cellular/etc. telephones utilizing any form of time-domain multiplexing technology. In this invention, before a mobile telephone transmits an RF burst, the mobile telephone broadcasts a one-way wireless warning transmission to any potentially affected devices that may be nearby. The affected devices will extract information from this warning broadcast and will prepare to utilize their blanking circuits to suppress the effects of the interfering signal while RF bursts are in progress. The user of the affected device does not notice the interference during the RF bursts because its audio circuits are simply disabled, or muted, during the periods of interference.

Furthermore, the present invention utilizes methods to minimize the audible effects of muting the signal in cases of audio signals. For example, the gaps in the audio signal while the signal is disabled can be replaced with an alternate audio signal. This alternate signal can be the playback of the previous sound or "comfort noise." Each gap in the audio signal is very small, only a fraction of a millisecond, which allows playback of the previous sound without the user noticing the repetition. The user will hardly notice a gap at all. Alternatively, since the rising and trailing edges of the RF transmission burst are the primary cause of interference to other devices, muting can be designed to take place only during these transition points, which should result in almost imperceptible blanking.

In an exemplary embodiment, the present invention is a system for mitigating the detrimental effects of interference to an affected device from a mobile telephone utilizing time-domain multiplexing. The system comprises a transmitter in communication with the mobile telephone's protocol stack which sends one-way warning transmissions to nearby devices, a receiver in potentially affected devices which receives these warning transmissions, and a blanking circuit in communication with the warning receiver which compensates for the interference upon reception of the warning transmission.

In another exemplary embodiment, the present invention is a system for mitigating the detrimental effects of interference to an affected device from a mobile telephone utilizing time-domain multiplexing. The system includes a transmitter onboard the mobile telephone which sends warning transmissions; a receiver onboard the affected device which receives warning transmissions; and a circuit in communication with the receiver which compensates for the interference upon reception of the warning transmission.

In yet another exemplary embodiment, the present invention is a method of mitigating the detrimental effects of interference to an affected device from a mobile telephone utilizing time-domain multiplexing. The method includes broadcasting a warning of impending interference; receiving the warning by an affected device; and disabling a signal for a duration corresponding to an interference.

DETAILED DESCRIPTION OF THE INVENTION

The present invention includes systems and methods to mitigate the detrimental effects of interference to electronic devices from mobile telephones utilizing any form of time-domain multiplexing technology. Before a mobile telephone transmits an RF burst, the telephone broadcasts a wireless warning transmission through a wireless transmitter. The warning transmission is received by an affected device, which contains a blanking circuit. The blanking circuit disables the interfered signal of the affected device while RF bursts are in progress. The warning transmission contains information concerning the timing of the RF bursts such that the blanking can correspond with these bursts to prevent the interference.

An "affected device," as used herein and throughout this disclosure, includes any electronic device that may be sensitive to interference by RF transmissions. The proper shielding of a device does not exclude it from this category because the device retains potential sensitivity due to unshielded affected devices that may be coupled with it. Affected devices include medical devices, computers, hearing aids, any device with a speaker, etc.

A "warning transmission," as used herein and throughout this disclosure, refers to the transmission of a one-way broadcast to nearby devices warning them of impending interference. This one-way broadcast message includes information regarding the time interval until the onset of this interference and the duration of interference.

A "blanking circuit," as used herein and throughout this disclosure, refers to the portion of an electronic device responsible for the controlled, intermittent disablement of input and/or output signal. A blanking circuit refers to the combination of an actuator and a switch or switches. A "blank" is the act of disabling the desired signal temporarily, then re-enabling it.

A "mobile telephone," as used herein and throughout this disclosure, refers to any mobile device that allows for wireless communication including cellular telephones, wireless internet pc cards, and any other cellular device.

Figure 1:
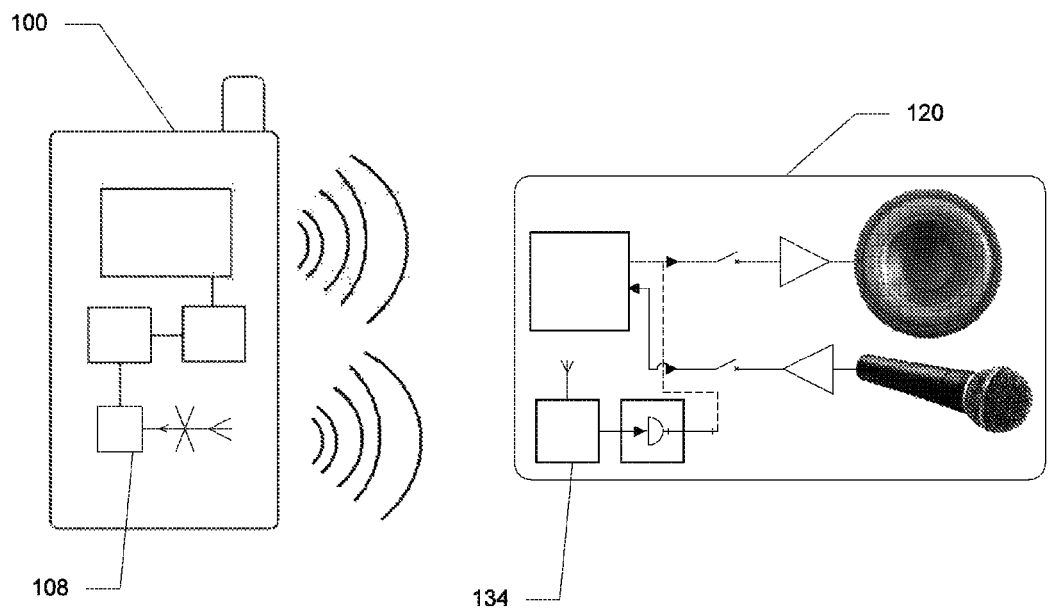
FIG. 1 shows a system to mitigate the detrimental effects of interference to an affected device, according to an exemplary embodiment of the present invention.

FIG. 1 shows a system to mitigate the detrimental effects of interference to an affected device, according to an exemplary embodiment of the present invention. In this embodiment, a mobile telephone 100 is in close proximity to an affected device 120. Mobile telephone 100 is prepared to make a phone call, which requires mobile telephone 100 to connect to a nearby cellular tower. Before mobile telephone 100 transmits an RF burst, it broadcasts an NFC warning transmission through a transmitter 108. The warning transmission is received by a receiver 134 within affected device 120. Receiver 134 communicates with a blanking circuit, alerting the blanking circuit to switch the desired signal off for the very brief intervals while RF bursts are in progress. The warning transmission contains information concerning the timing of the RF bursts such that blanking is properly aligned in time with these bursts to prevent the interference.

Figure 2:
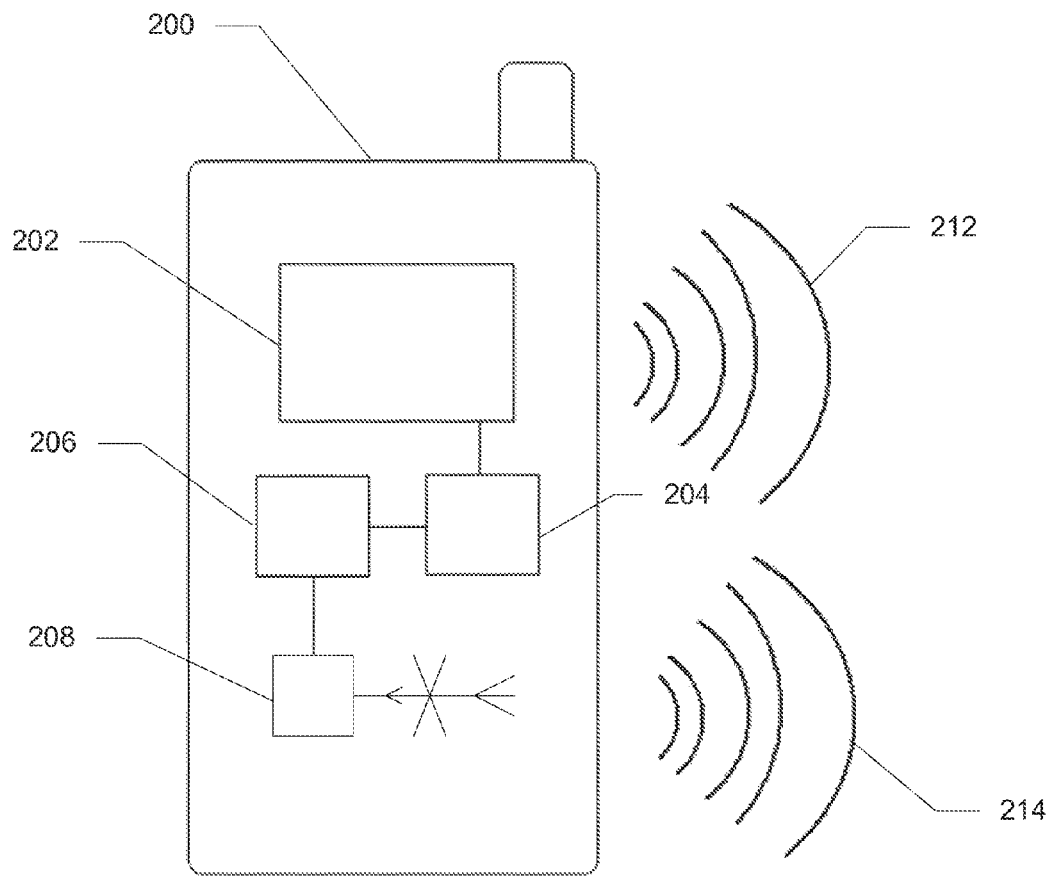
FIG. 2 shows a GSM telephone with an integrated NFC transmission circuit, according to an exemplary embodiment of the present invention.

FIG. 2 shows a GSM telephone with an integrated NFC transmission circuit, according to an exemplary embodiment of the present invention. In this embodiment, a GSM telephone 200 contains an RF transmitter 202, a GSM protocol stack 204, an NFC burst formatter 206, and a near field transmitter 208, and the ability to send out RF burst transmission 212. GSM telephone 200 has a priori knowledge of when it is about to send a transmission from its protocol stack 204. GSM protocol stack 204 communicates with NFC burst formatter 206. In embodiments of the present invention, this communication is a logic signal that changes its logical state (in these figures, the logic signal goes "high") a certain amount of time ($\Delta T$) before an actual RF burst transmission 212. This amount of time ($\Delta T$) allows the phone 200 to proactively transmit its warning bursts by a specific amount of time and therefore maintain time-alignment between the phone's transmitter 202 and the blanking circuit in an affected device. The absolute delay (in microseconds) between a warning transmission from the NFC transmitter 208 and an RF burst 212 from the phone's transmitter 202 is included by the NFC formatter 206 in the one-way warning broadcast 214. The NFC burst formatter 206 provides an interface between GSM protocol stack 204 and NFC transmitter 208. NFC transmitter 208 only transmits blanking pulse information via the broadcast 214 in advance of transmission of a GSM burst 212.

Figure 7:
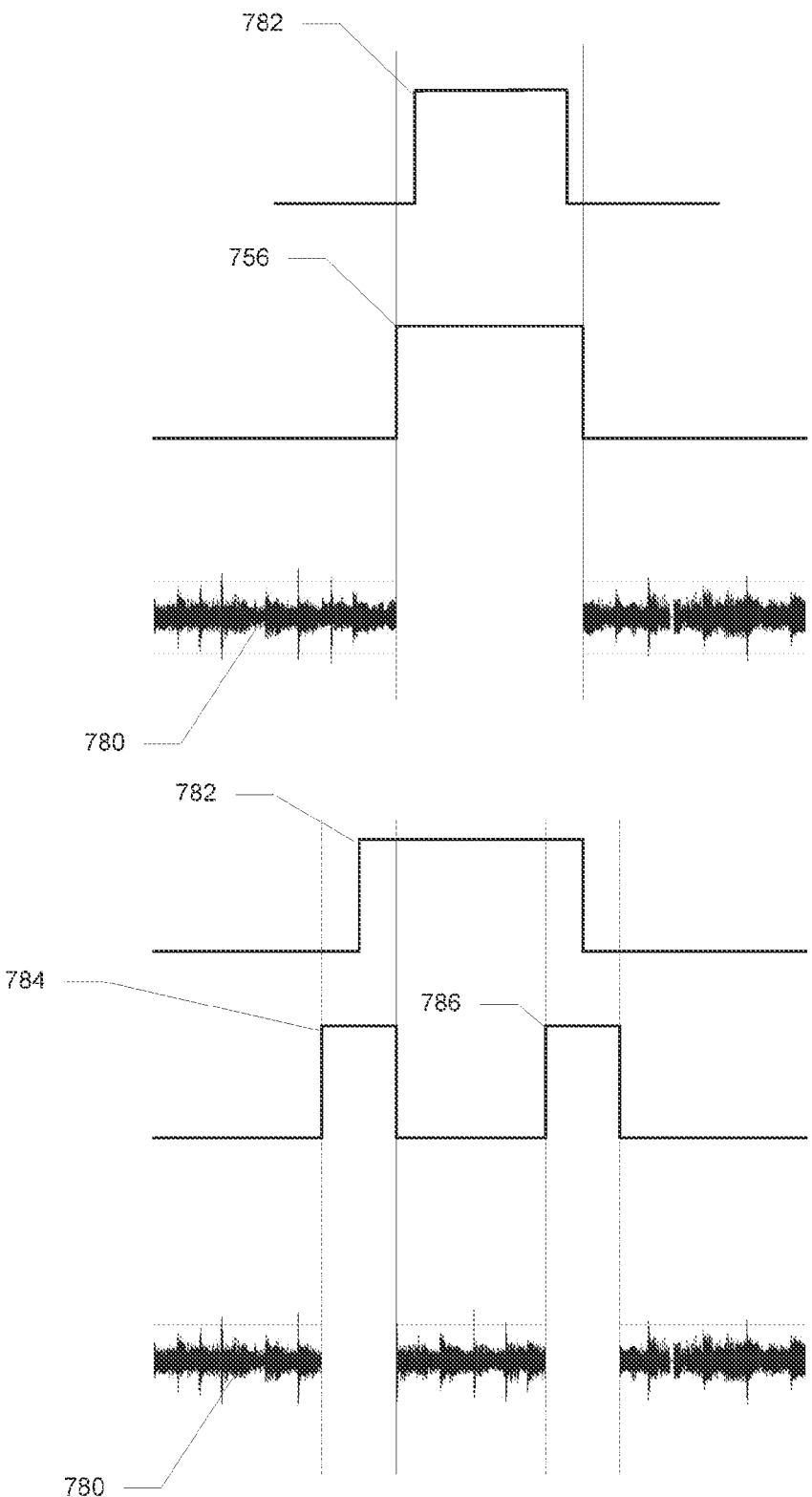
FIG. 7 shows the timing of blanking according to an exemplary embodiment of the invention.

The mobile telephone 200 transmits a low-power wireless warning transmission only when the phone is not in a quiescent state in order to save the telephone's battery. In the GSM radio standard, devices transmit RF bursts with a duration of 577 μs. It is the sudden change in power of these bursts, especially at the beginning and end of each burst (e.g., the burst's rising and trailing edge), which interfere with affected electrical devices. When the mobile telephone is about to transmit an RF burst, it first broadcasts a wireless warning transmission, alerting the affected device before the interference begins. The warning transmission provides the affected device with information including the timing and duration necessary for the blank. The warning receiver in nearby affected devices can be configured to blank during the entire period of the burst (full blanking) or just prior to the leading and trailing edges of the burst with compensation for imperfect time alignment (partial blanking), the result of which would be almost imperceptible blanking. These variations are shown in FIG. 7 and described in more detail below.

The amount of time ($\Delta T$) between the broadcasting of the warning transmission and the RF burst is set based on protocol and network delays. The absolute delay (in microseconds) between 350 and the onset of an RF burst transmission is included in the one-way warning broadcast to affected devices so that the affected devices do not disable more of the desired signal than necessary. In embodiments of the present invention, the blank lasts around 600 μs, such that it is longer than the RF burst, and can prevent the interference caused by the RF burst.

Figure 3:
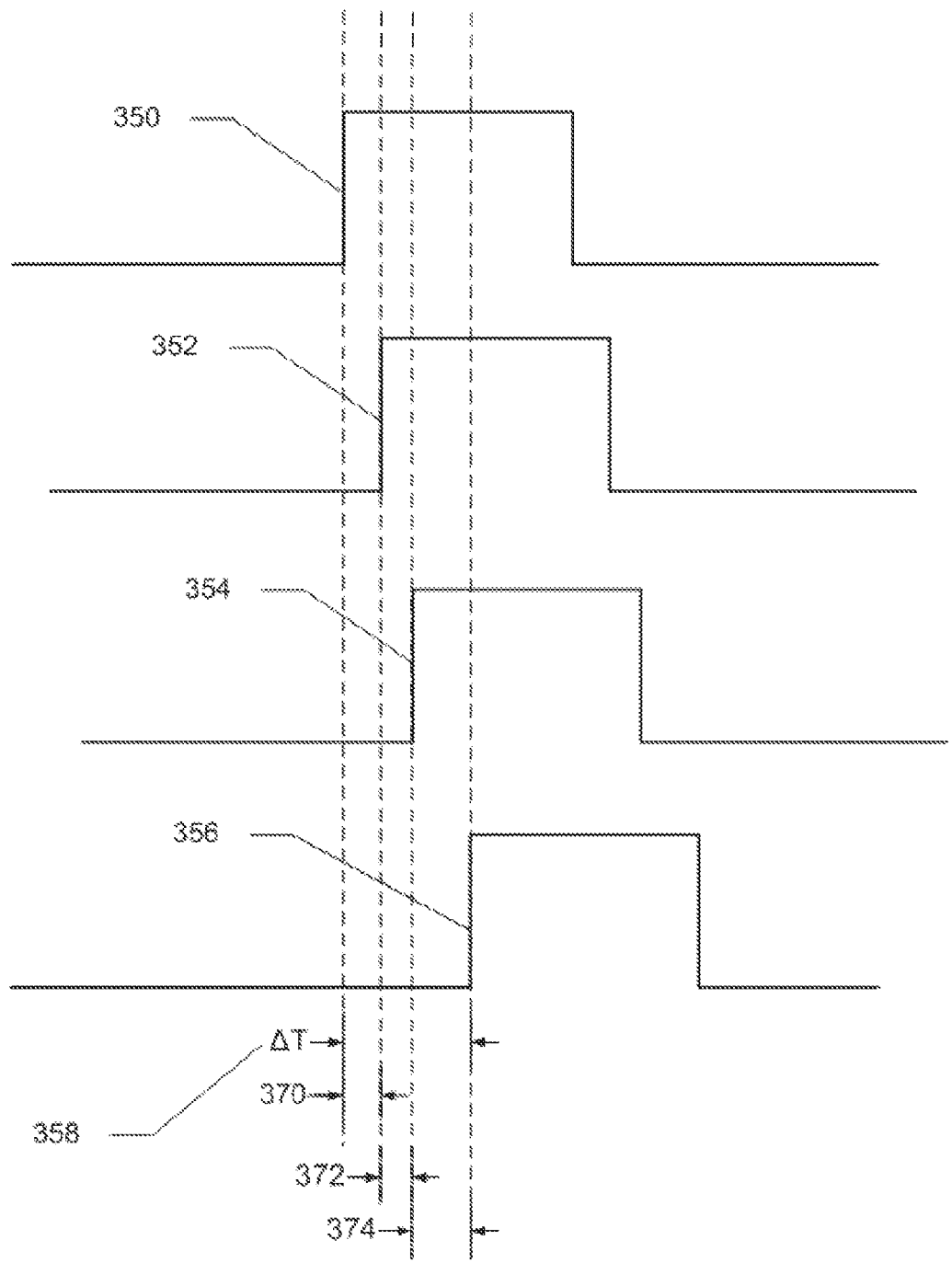
FIG. 3 shows the total time delay (/1 T) between the point in time when the cellular telephone broadcasts the warning transmission and the point at which blanking occurs in the affected device, according to an exemplary embodiment of the present invention.

The total time delay ($\Delta T$) between the point at which the cellular telephone broadcasts the warning transmission and when blanking occurs in the affected device is illustrated in FIG. 3. For reference, the leading edge of the first timing signal 350 corresponds to a notification that an RF transmission is impending, as determined by the phone's protocol stack. $\Delta T$ 358 is divided into three parts: an NFC transmitter delay 370, an NFC receiver delay 372, and an affected device blanking circuit delay 374. NFC transmitter delay 370 is the amount of time it takes for the warning transmission to move through the NFC formatter circuit. NFC receiver delay 372 is not an internal delay, but a pause that the control circuits following the NFC receiver insert to ensure that blanking commands are properly time aligned with the phone's RF burst. This pause will vary from affected device to affected device depending on its NFC receiver's internal delay. NFC formatters all have a similar delay, but NFC receivers coupled with blanking circuits will not have the same delay. If the NFC receiver has the maximum delay, then the NFC receiver delay will be nearly zero. If the NFC receiver has less than the maximum delay, then the active NFC receiver delay is used to ensure time alignment by waiting a set amount of time before activating the blanking circuit. Affected circuit delay 374 is the amount of time it takes for the blanking circuit to activate the actuator and open the switches. When blanking is included in an affected device, the affected device's intrinsic delays are known, so it will be a simple matter to set any timers associated with 372 and 374 such that the onset of blanking at 356 precedes the phones RF burst by about 12 microseconds, thereby ensuring that blanking begins just prior to the onset of the RF burst transmission.

Alternatives to NFC are also possible, including many variations of short range communication. Among these possibilities for the warning communication between the phone and affected devices is infrared. The use of infrared allows for the warning communication to be received from a greater distance, such as when the phone first enters the room but is still too far away for an NFC transmission to be received. NFC and infrared are probably the best approaches since these mechanisms do not require a "formal" link between a mobile telephone and an affected device and a very minimal protocol stack is required. Additionally, a BLUETOOTH communication can be established between the mobile telephone and the affected device. This, however, requires two-way communication between a mobile telephone and an affected device, whereas other forms only require one-way communication.

In embodiments of the invention, the user may elect to disable the blanking feature. This is accomplished by selecting the appropriate choice in an enable/disable menu feature on the mobile telephone.

In order to block RF burst transmission interference, the sensitive signal must be identified first. For many applications this is simply the audible signal of the affected device, or the signal upon which the speaker operates. For medical devices there may be several signals that are sensitive to interference, each one of them being an important element in the overall function of the device. The manner in which this blanking is implemented will depend on the design of the affected device, but will typically involve disabling the final audio amplifier stage in audio devices and may call for gating clocks or some similar method in a data or control device. Once each sensitive signal has been identified, a blanking circuit is inserted with a switch for each sensitive signal. Upon actuation according to an event, each switch opens a circuit. For a circuit featuring a speaker, the opening of the circuit works to mute the speaker.

FIGS. 4A-4D feature a receiver according to an exemplary embodiment of the present invention. The receiver resides inside the affected device close to the blanking circuit. The receiver leaves the switches open for the amount of time specified in the warning transmission. For a TOMA RF burst transmission this amount of time should be around 600 µs. Alternately, the switches could switch the circuit from one route to another instead of simply opening the circuit. A speaker will mute once its circuit is opened, but the switch could connect the circuit to a different source. In order to make instances of blanking less noticeable in the case of audio devices, the affected device may employ a method of generating either "comfort noise" during the blanking period, or in the case of digital audio, may actually "fill" the audio hole caused by blanking with some aspect of the audio that immediately preceded the blanking period. The usage of either comfort noise or audio artifacts should be very effective, since the pulse width employed by mobile telephones is typically very short. Methods of inserting alternate audio signals during the blank will be readily apparent to one skilled in the art.

Figure 4A:
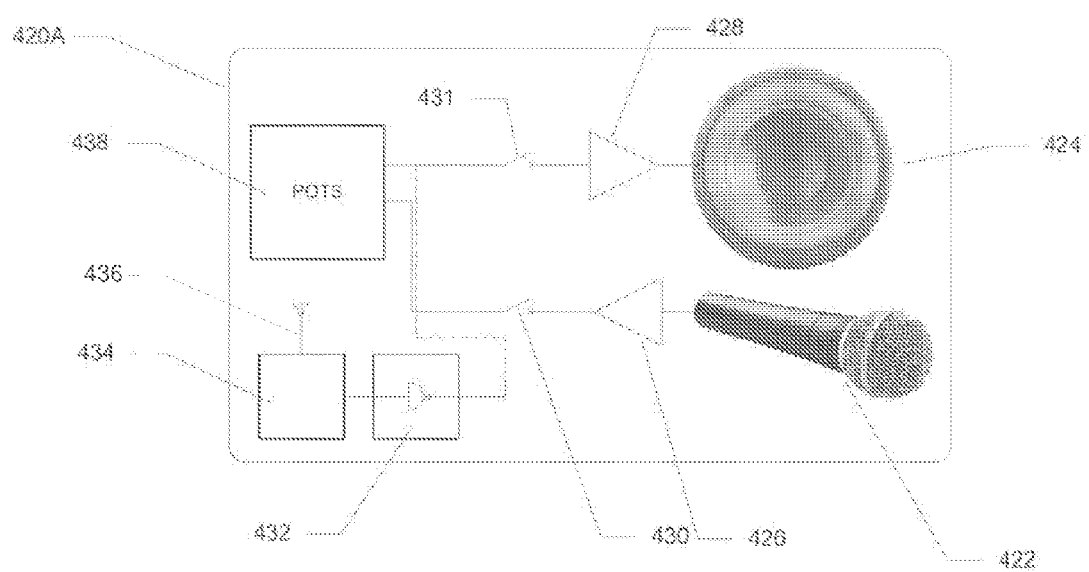
FIG. 4A shows a speakerphone featuring a blanking circuit, according to an exemplary embodiment of the present invention.

A speakerphone 420A featuring a blanking circuit, according to an exemplary embodiment of the present invention, is shown in FIG. 4A. Speakerphone 420A comprises an actuator 432, a first and second switch 431, a speaker 424, a microphone 422, a speaker amplifier 428, a microphone amplifier 426, a wireless receiver 434, and a plain old telephone system (POTS) 438. Wireless receiver 434 is in communication with actuator 432, which controls first and second switches 431. POTS 438 is in communication with microphone 422 and speaker 424 with the respective amplifiers, 426 and 428, in line between them.

During normal operation, actuator 432 and switches 430 and 431 are not used. However, wireless receiver 434 remains in a "listen" mode where it is capable of receiving warning transmissions from wireless transmitters through NFC antenna 436. Once a warning transmission is received, wireless receiver 434 reads the duration and time offset of the impending RF transmission. Having read the duration and time offset, wireless receiver 434 uses actuator 432 to activate the switches 430 and 431. Switches 430 and 431 open the circuits of microphone 422 and speaker 424 to mute any sound through speakerphone 420A. After the duration of time has passed, switches 430 and 431 close the circuits and use of the device continues as normal. This process, from the reception of the warning transmission to the final closing of the circuit, is very fast, lasting much less than a second. An RF burst transmission has a pulse width of about 577 µs. In order for this blanking circuit to open switches 430 and 431 effectively, they need to be very fast, and they must activate just prior to (e.g., approximately 12 microseconds in the case of GSM) the onset of an RF burst transmission.

Figure 4B:
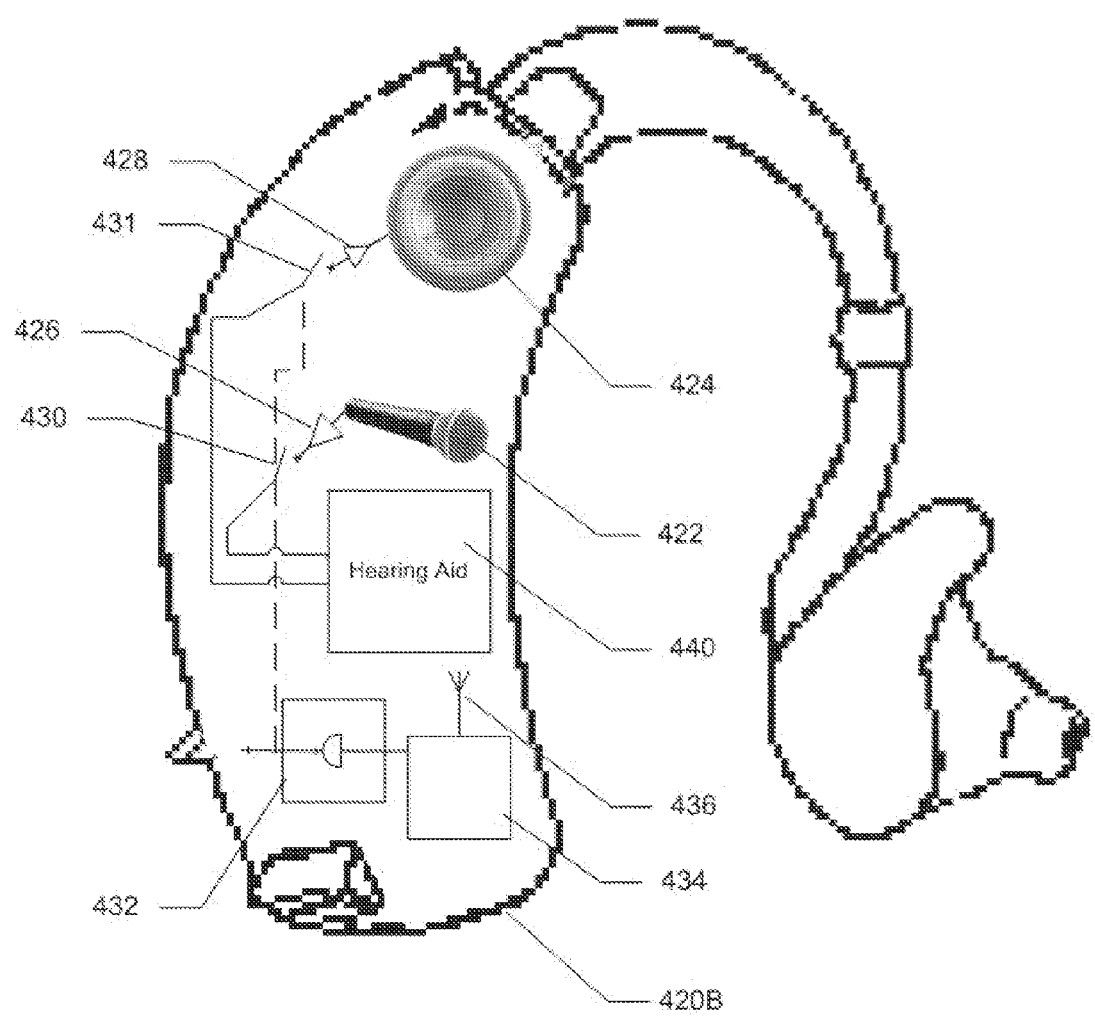
FIG. 4B shows a hearing aid featuring a blanking circuit, according to an exemplary embodiment of the present invention.
Figure 4C:
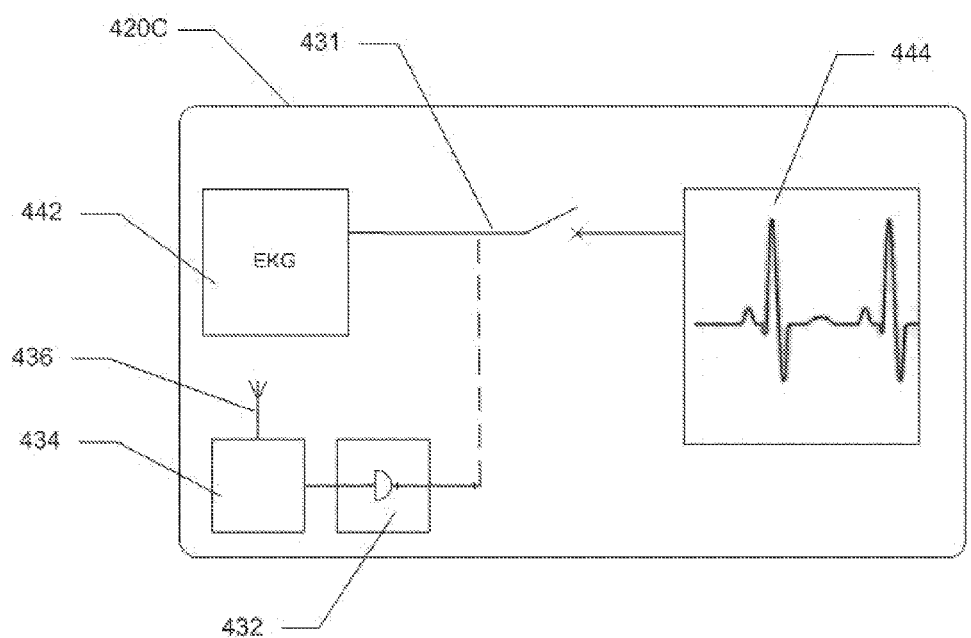
FIG. 4C shows an electrocardiogram (EKG) featuring a blanking circuit, according to an exemplary embodiment of the present invention.
Figure 4D:
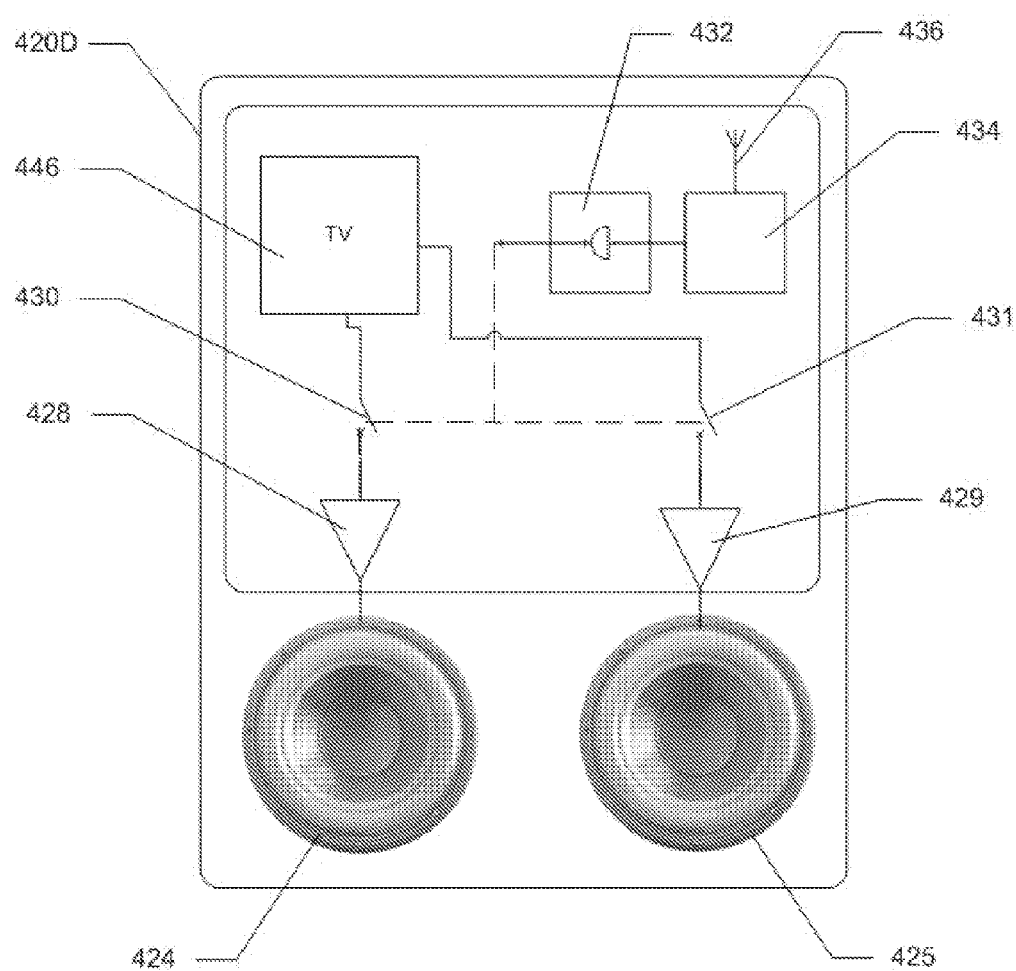
FIG. 4D shows a television featuring a blanking circuit, according to an exemplary embodiment of the present invention.

Other exemplary embodiments of a receiver are shown in FIGS. 4B-4D. FIG. 4B shows a hearing aid 420B with a blanking receiver comprising a microphone 422, a speaker 424, a microphone amplifier 426, a speaker amplifier 428, a first switch 430 connected to the microphone, a second switch 431 connected to the speaker, an actuator 432, an NFC receiver 434, NFC antenna 436, and the rest of the hearing aid circuitry 440. When the warning transmission is received by NFC receiver 434, actuator 432 opens switches 430 and 431 connected to speaker 424 and microphone 422 for a duration of 600 milliseconds (ms).

FIG. 4C shows an electrocardiogram (EKG) 420C comprising an actuator 432, an NFC receiver 434, NFC antenna 436, and a switch 431 between the monitor 444 and the rest of the EKG circuitry 442. When a warning transmission is received by NFC receiver, actuator 432 opens switch 431 which disables the incoming desired signal for about 600 µs.

FIG. 4D shows a television 420D comprising a left speaker 424, a right speaker 425, a left amplifier 428, a right amplifier 429, a left switch 430, a right switch 431, an actuator 432, an NFC receiver 434, NFC antenna 436, and the rest of the television hardware 446. When a warning transmission is received by NFC receiver 434, actuator 432 opens right and left switches 430 and 431, which mutes right and left speakers 424 and 425 for a duration of about 600 ms.

Figure 5:
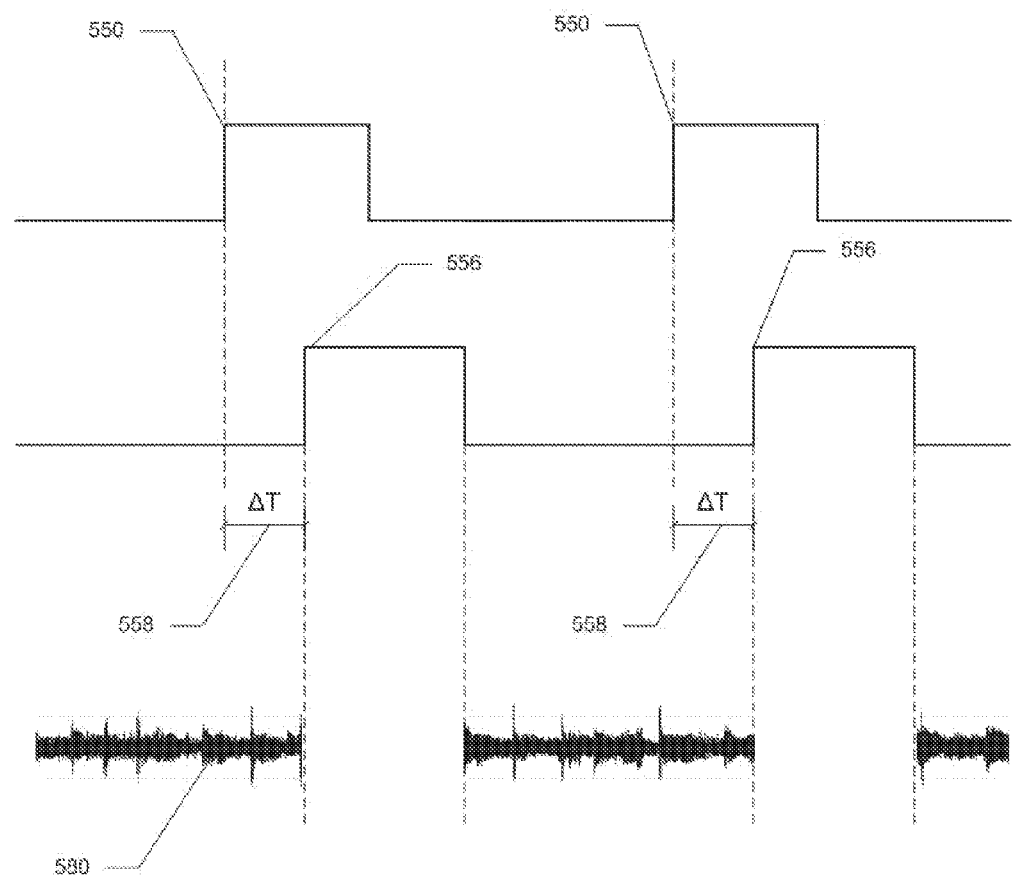
FIG. 5 shows the effects of blanking on an audio signal, according to an exemplary embodiment of the present invention.

FIG. 5 shows the effects of blanking on a sensitive audio signal, according to an exemplary embodiment of the present invention. In this embodiment, a warning transmission is broadcast an amount of time, $\Delta T$ 558, before actual blanking takes place. $\Delta T$ 558 is the period of time between a leading edge 550 of the signal alerting the phone's NFC transmitter of the need to send a warning transmission and a leading edge 556 of the onset of audio blanking. The absolute value of $\Delta T$ 558 (in microseconds) is included in the one-way broadcast from the phone, and therefore is known to the affected device, which allows it to compensate for any internal circuit delays. The period of blanking begins at leading edge 556 and lasts for approximately 600 µs. In the case of GSM, $\Delta T$ 558, which is included in the one-way warning broadcast, will include a 12 microsecond timing offset to allow the 600 microsecond blanking interval to be centered on the 577 microsecond RF burst transmission. During this blanking interval, a sensitive audio signal 580 in the affected device is muted by opening the audio circuit. When the blanking completes, the audio circuit is closed and the audio signal resumes.

Figure 6:
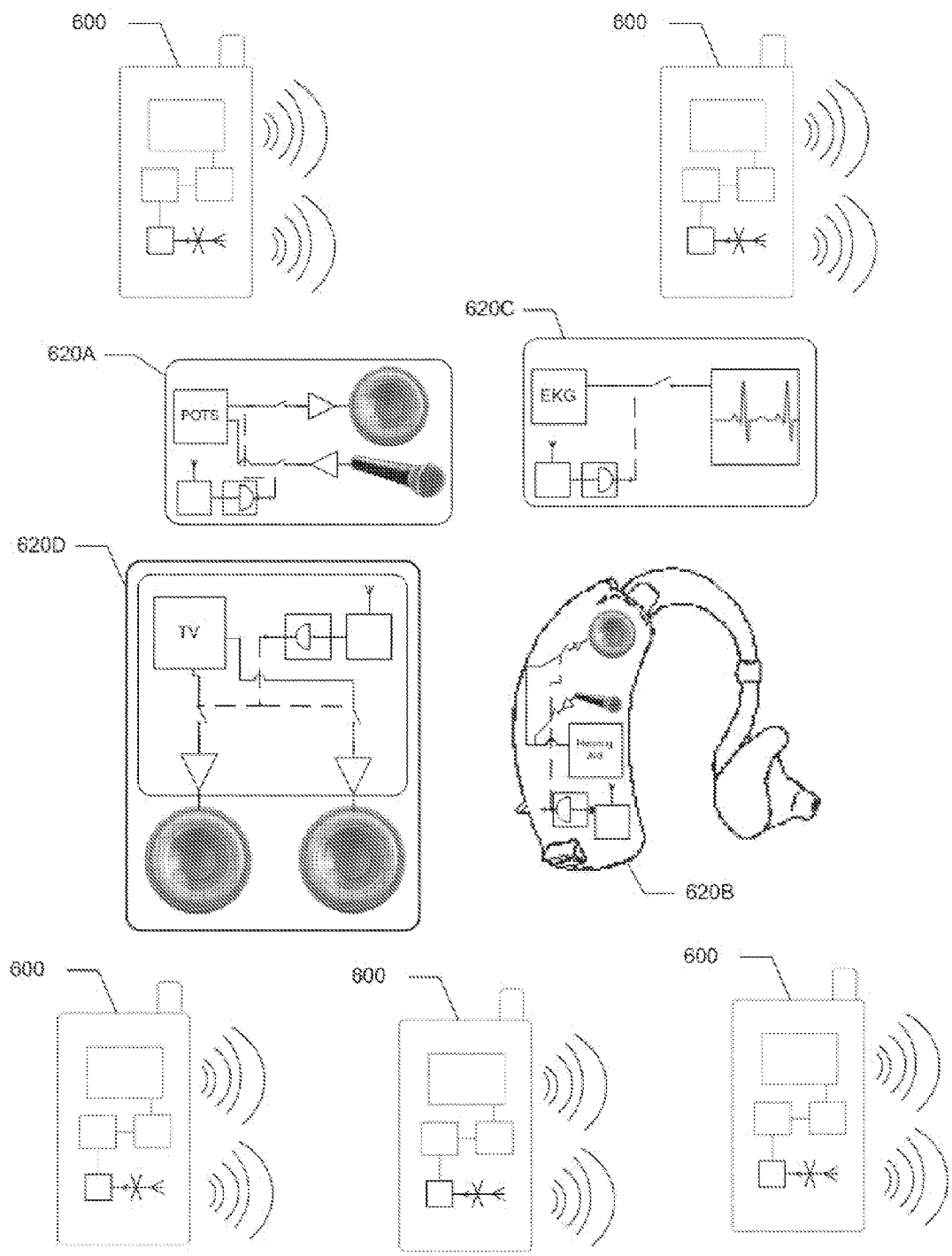
FIG. 6 shows multiple mobile telephones in proximity to affected devices, according to an exemplary embodiment of the present invention.

FIG. 6 shows multiple mobile telephones in proximity to affected devices. In this embodiment, mobile telephones 600 are each transmitting RF bursts as well as warning transmissions. Each of speakerphone 620A, hearing aid 620B, EKG 620C, and television 620O are within a range that is ordinarily affected by RF bursts in the form of static in the speaker or flaws in the output. In this embodiment, each of these affected devices contains a blanking circuit. Because the warning transmissions from mobile telephones 600 are one-way communications, each warning transmission from mobile telephones 600 is received. Blanking by the affected device occurs at any time a mobile telephone 600 transmits an RF burst.

FIG. 7 shows the timing of a blanking event according to an exemplary embodiment of the invention. In the previously described embodiments, the blanking interval 756 lasts for approximately 600 µs. This allows the blanking circuit to mute the signal throughout the entire RF burst 782 from a mobile telephone, and for it to be properly centered on the RF burst. However, this blanking interval created a muted portion of the audio 780, lasting the entire 600 μs. In the present embodiment, the affected device receives the warning transmission, alerting it that an RF burst is impending. The blanking circuit blanks during the leading edge of the 577 μs RF burst 782 as well as the trailing edge of the burst 782 through blanking pulses 784 and 786, respectively. Because the leading edge and the trailing edge of the RF burst 782 are the main cause of the interference received by the affected device, blanking during only these portions effectively prevents the interference while greatly minimizing audio signal loss. Because blanking is not being used for the entire duration of the RF burst, audio dropout is greatly minimized, and the audio signal remains clear.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A mobile telephone comprising:
    a radio frequency transmitter configured to transmit a radio frequency transmission burst;
    a protocol stack;
    a short range communication formatter configured to receive, from the protocol stack prior to a transmission of the radio frequency transmission burst, an indication of the transmission of the radio frequency transmission burst; and
    a short range communication transmitter associated with the short range communication formatter, the short range communication transmitter configured to broadcast, to a receiver associated with an affected device prior to the transmission of the radio frequency transmission burst, a warning transmission comprising a timing and a duration associated with the transmission of the radio frequency transmission burst for use by the affected device to time blanking of the affected device, wherein a duration of blanking of the affected device spans an entire pulse width of the radio frequency transmission burst based on the timing and the duration associated with the transmission of the radio frequency transmission burst provided by the warning transmission.

2. The mobile telephone of claim 1, wherein the warning transmission is broadcast to the receiver associated with the affected device a fixed amount of time prior to the transmission of the radio frequency transmission burst.

3. The mobile telephone of claim 2, wherein the fixed amount of time is based on protocol and network delays.

4. The mobile telephone of claim 1, wherein the duration of blanking of the affected device is about 600 microseconds.

5. The mobile telephone of claim 1, wherein the warning transmission is a one-way communication.

6. The mobile telephone of claim 1, wherein the short range communication transmitter is at least one of a near field communication transmitter or an infrared transmitter.

7. The mobile telephone of claim 1, wherein the receiver associated with the affected device is at least one of a near field communication receiver or an infrared receiver.

8. An affected device comprising:
    a receiver configured to receive, prior to receiving a radio frequency transmission burst associated with a mobile telephone, a warning transmission from a short range communication transmitter associated with the mobile telephone, the warning transmission comprising a timing and a duration associated with a transmission of the radio frequency transmission burst; and
    a circuit configured to blank the affected device based on the timing and the duration associated with the transmission of the radio frequency transmission burst provided by the warning transmission, wherein a duration of blanking of the affected device spans an entire pulse width of the radio frequency transmission burst based on the timing and the duration associated with the transmission of the radio frequency transmission burst provided by the warning transmission.

9. The affected device of claim 8, wherein the duration of blanking the affected device is about 600 microseconds.

10. The affected device of claim 8, wherein the circuit is further configured to enable an alternate audio signal during blanking of the affected device.

11. The affected device of claim 8, wherein the warning transmission is received a fixed amount of time prior to the transmission of the radio frequency transmission burst.

12. The affected device of claim 11, wherein the fixed amount of time is based on protocol and network delays.

13. The affected device of claim 8, wherein the warning transmission is a one-way communication.

14. The affected device of claim 8, wherein the short range communication transmitter is at least one of a near field communication transmitter or an infrared transmitter.

15. The affected device of claim 8, wherein the receiver is at least one of a near field communication receiver or an infrared receiver.

16. A method comprising:
    receiving, at an affected device from a mobile telephone, a warning transmission, the warning transmission comprising a timing and a duration associated with a transmission of a radio frequency transmission burst associated with the mobile telephone, the warning transmission received prior to the transmission of the radio frequency transmission burst; and
    in response to receiving the warning transmission, utilizing a switch of the affected device to suppress, for a duration, an effect on the affected device of the transmission of the radio frequency transmission burst, wherein the duration spans an entire pulse width of the radio frequency transmission burst based on the timing and the duration associated with the transmission of the radio frequency transmission burst provided by the warning transmission.

17. The method of claim 16, further comprising generating an alternate audio signal at least during the transmission of the radio frequency transmission burst.

18. The method of claim 16, wherein utilizing the switch of the affected device to suppress the effect on the affected device comprises muting a speaker of the affected device.

19. The method of claim 16, wherein utilizing the switch of the affected device to suppress the effect on the affected device comprises disabling a final audio of the affected device.

20. The method of claim 16, wherein the warning transmission is a one-way communication.

\* \* \* \* \*